United States Patent
Casper et al.

(10) Patent No.: US 9,643,137 B2
(45) Date of Patent: May 9, 2017

(54) VENTURI DEVICE AND METHOD (71) Applicants: Thomas Casper, Waukesha, WI (US);
Jeffrey Casper, Minneapolis, MN (US)

(72) Inventors: Thomas Casper, Waukesha, WI (US);
Jeffrey Casper, Minneapolis, MN (US)

( * ) Notice: Subject to any disclaimer, the term of this patent is extended or adjusted under 35 U.S.C. 154(b) by 0 days.

(21) Appl. No.: 15/222,398

(22) Filed: Jul. 28, 2016

(65) Prior Publication Data

US 2016/0332125 A1    Nov. 17, 2016

Related U.S. Application Data (62) Division of application No. 14/746,022, filed on Jun. 22, 2015, now Pat. No. 9,415,355, which is a division of application No. 13/398,391, filed on Feb. 16, 2012, now abandoned.

(60) Provisional application No. 61/443,370, filed on Feb. 16, 2011.

(51) Int. Cl.
B01F 5/04 (2006.01)
B01F 3/04 (2006.01)
C12G 1/00 (2006.01)
C12H 1/14 (2006.01)
B67D 3/00 (2006.01)

(52) U.S. Cl.
CPC .......... *B01F 5/0428* (2013.01); *B01F 3/0446* (2013.01); *B01F 3/04439* (2013.01); *B01F 3/04503* (2013.01); *B01F 3/04787* (2013.01); *B67D 3/0016* (2013.01); *C12G 1/00* (2013.01); *C12H 1/14* (2013.01); *B01F 2215/0072* (2013.01)

(58) Field of Classification Search
CPC ... B01F 3/04439; B01F 5/0423; B01F 5/0428

USPC ............................... 366/163.2; 137/888–895
See application file for complete search history.

(56) References Cited

U.S. PATENT DOCUMENTS

| 141,361 A | 7/1873 | Korting |
| 513,857 A | 1/1894 | Adam |
| 846,395 A | 3/1907 | Busenbenz |
| 1,052,051 A | 2/1913 | Grimes |
| 1,786,357 A | 12/1930 | Miller |
| 2,241,337 A | 5/1941 | Work |
| 2,424,654 A | 7/1947 | Blount |

(Continued)

FOREIGN PATENT DOCUMENTS

| BR | 8702702 | 12/2007 |
| CN | 201379435 | 4/2009 |

(Continued)

OTHER PUBLICATIONS

International Search Report and Written Opinion for PCT/US12/25444, dated May 29, 2012.

*Primary Examiner* — Abbas Rashid
(74) *Attorney, Agent, or Firm* — Ryan Kromholz & Manion, S.C.

(57) ABSTRACT

An improved venturi device and method for facilitating the mixture of fluid substances, such as wine and air. The device may be combined with a dispensing valve to further promote functionality. The improved venturi device is especially effective in drawing a second fluid into the primary flow of a first fluid, and when combined with a dispensing valve it obviates the need for a venturi independent from a valve to accomplish mixing at low flows and low liquid head pressure.

9 Claims, 6 Drawing Sheets

(56) References Cited

U.S. PATENT DOCUMENTS

| | | |
|---|---|---|
| 2,899,971 A | 8/1959 | Munter |
| 3,038,809 A | 6/1962 | Fitzmaurice et al. |
| 3,304,564 A | 2/1967 | Green et al. |
| 3,643,688 A | 2/1972 | Meinert |
| 4,051,204 A | 9/1977 | Muller et al. |
| 4,157,304 A | 6/1979 | Molvar |
| 4,264,212 A | 4/1981 | Tookey |
| 4,405,087 A | 9/1983 | Mata-Garza |
| 4,573,803 A | 3/1986 | Gritters et al. |
| 4,595,121 A | 6/1986 | Schultz |
| 4,721,126 A | 1/1988 | Horii |
| 4,761,077 A | 8/1988 | Werner |
| 5,211,475 A | 5/1993 | McDermott |
| 5,538,027 A | 7/1996 | Adamson et al. |
| 5,577,670 A | 11/1996 | Omata et al. |
| 5,595,104 A | 1/1997 | Delaplaine |
| 5,645,223 A | 7/1997 | Hull et al. |
| 5,839,670 A | 11/1998 | Omata et al. |
| 5,893,641 A | 4/1999 | Garcia |
| 6,253,667 B1 | 7/2001 | Lussi et al. |
| 6,279,611 B2 | 8/2001 | Uematsu et al. |
| 6,290,917 B1 | 9/2001 | Yamamoto |
| 6,299,343 B1 | 10/2001 | Peterman |
| 6,523,991 B1 | 2/2003 | Maklad |
| 6,568,660 B1 | 5/2003 | Flanbaum et al. |
| 6,623,154 B1 | 9/2003 | Garcia |
| 6,994,276 B2 | 2/2006 | Faye et al. |
| 7,140,558 B2 | 11/2006 | McCracken et al. |
| 7,156,377 B2 | 1/2007 | Chapman et al. |
| 7,188,743 B1 | 3/2007 | Gates et al. |
| 7,299,743 B2 | 11/2007 | Moore |
| 7,614,614 B2 | 11/2009 | Dabadicci et al. |
| 7,726,870 B1 | 6/2010 | Lott |
| D624,355 S | 9/2010 | Tiso |
| 7,841,584 B2 | 11/2010 | Sabadicci et al. |
| 2002/0069645 A1 | 6/2002 | Mowill |
| 2003/0232115 A1 | 12/2003 | Eckenhausen et al. |
| 2006/0027938 A1 | 2/2006 | Chapman et al. |
| 2007/0187848 A1 | 8/2007 | Sabadicci et al. |
| 2007/0295761 A1 | 12/2007 | Simons |
| 2009/0078721 A1* | 3/2009 | Hoffman ................ B65D 77/06 222/1 |
| 2009/0160072 A1 | 6/2009 | Chiorazzi |
| 2011/0042835 A1 | 2/2011 | Sabadicci et al. |

FOREIGN PATENT DOCUMENTS

| | | |
|---|---|---|
| DE | 29710631 | 6/1997 |
| GB | 323242 | 6/1928 |
| SU | 605830 | 8/1976 |

* cited by examiner

VENTURI DEVICE AND METHOD

RELATED APPLICATION

This application is a divisional of U.S. patent application Ser. No. 14/746,022 filed 22 Jun. 2015 (U.S. Pat. No. 9,415,355 dated 16 Aug. 2016), which is a divisional of U.S. patent application Ser. No. 13/398,391 filed 16 Feb. 2012 (abandoned), which claims the benefit of provisional U.S. patent application Ser. No. 61/443,370 filed 16 Feb. 2011.

BACKGROUND OF THE INVENTION

The present invention relates generally to devices and methods used for mixing at least two fluids, wherein the fluids may be liquids or gases or a combination of both. Particularly, the present invention relates to a venturi device for use in the aeration of wine and a method of use. Specifically, the present invention is directed to a venturi device for use in the aeration of wine when dispensed from a bladder through a valve, such as that found in boxed wine, but should not be limited to that purpose only.

Wine connoisseurs often expose wine to air, or aerate the wine, prior to drinking. Aeration may be used by connoisseurs to enhance the taste experience, for example, as a way to open up young wines to make them more balanced and smoother by softening tannins, or to improve the expression, harmony, and smoothness of the wine flavor. Aeration is also known to reduce the high carbon dioxide level often found in young wines and the accompanying odor that masks their true aroma. Many wine connoisseurs believe that the flavor of most wine, particularly red wine, improves with aeration by revealing the true complex personality. One method of wine aeration is to simply uncork the bottle and allow the open bottle to sit for the length of time deemed proper for the particular bottle. While this method has been used for years, it is inefficient and causes the drinker to wait for the requisite time, and further, the narrow bottleneck may encumber most air from opening up the wine. If time is not a concern, the connoisseur may simply let the wine aerate slowly in a glass. Another aeration method involves the use of a decanter and an aerating funnel. Since a decanter is essentially a pitcher with a wide opening, the increased decanter surface area permits more rapid aeration. The additional use of an aerating funnel during pouring further aids in aeration.

Other methods of wine aeration include the use of aeration devices marketed specifically for the wine enthusiast. Some, such as those marketed under the RABBIT®, SOIREE™, and RESPIRER® trademarks, provide aeration using a vortex generator to swirl the wine. A popular device, marketed under the trademark VINTURI®, and disclosed in U.S. Pat. No. 7,614,614, produces an aerated wine using a venturi device that is hand-held or placed in a holding stand while the wine is poured through it. While devices such as this may have some applicability, they can be awkward to manipulate. For example, a drawback to designs such as these is that the user must be especially careful to control and limit the flow from the bottle to avoid overflow of the entrance section. Another problem is that the user must pour accurately into the entrance section to prevent wine from flowing out of the air entry passages. This creates an unsanitary and unpleasant experience for the user.

Furthermore, rigid boxes containing a flexible bladder holding a liquid such as wine have become a popular method of marketing and selling such products. The containers are usually sold in 3 liter or larger sizes. While aeration of wine prior to consumption is desirable, oxidation and spoilage may occur if wine is in contact with oxygen for extended periods. Box wines are advantageous since the consumer is able to dispense "fresh" wine over a long period of time as compared with bottled wine which must be consumed relatively quickly or risk spoilage. The advantage of bladder-contained box wine results from the wine in the bladder being protected from exposure to oxygen prior to dispensing. This protection is furthered by incorporation of a valve mechanism that prohibits oxygen from entering the bladder. Although the bladder and valve system protects the non-dispensed wine from oxidation, from a taste perspective, the arrangement can also be seen as a disadvantage because, as mentioned, aeration of the wine immediately prior to consumption can greatly improve the character and complexity of the wine's flavor and aroma. Furthermore, such boxed wines are relatively large and difficult to maneuver while dispensing wine into a glass. The handling difficulty therefore encumbers the user from dispensing the wine through a hand-held aerator, such as those mentioned, or even through an aerator supported on a stand. Therefore, there is a need for an aeration device for use with bladder types, or other types of fluid dispensing devices, such as those used with box wine.

The contemplated device provides an inexpensive, easy to produce and package, easy to handle, and reliable device and method for dispensing aerated wine from a bladder or other type of fluid container without the need for additional expensive and cumbersome external devices. Additionally, since initial aeration of box wine occurs during dispensation, the contemplated device provides a user friendly device for providing efficient and increased aeration and therefore an enhanced wine consumption experience when consuming box wine. The present invention provides a novel aeration device and an aeration device which is integrated with, or in-line with a valve, along with a method of using, to thereby improve the flavor of dispensed box wine and consumer perception of quality therewith.

Venturi devices are well known in the art of measuring fluid flow and mixing fluids. Without exception, they include an entrance section, a constricted middle section, and an exit section. In operation, as a fluid flowing at a certain velocity in the entrance section encounters the constricted middle section, the fluid velocity will correspondingly increase according to the continuity equation: $Q=V_1 A_1=V_2 A_2$, where Q is the constant flow rate, V is the mean velocity of the flow, and A is the cross sectional area of the flow. Generally, a second fluid may be introduced into the fluid stream at the constricted middle section where the increased velocity has created a pressure differential between the outside of the venturi and the intermediate fluid passage.

The present invention overcomes the shortcomings of known box wine dispensing arrangements, including those having valves, by providing an aeration device in the form of a novel venturi apparatus. The novel venturi apparatus includes unique air induction passages that minimize leaks or drips. The apparatus may be further integrated with a dispensing valve, such as that used with box wine. Furthermore, the apparatus creates new and unexpected results due to its ability to aerate wine that has not been previously exposed to air by using only the internal head pressure provided by the box wine or other container type.

SUMMARY OF THE INVENTION

The present invention is directed to an improved venturi device that may be attachable to, or integrated with, a dispensing valve or spout of a fluid. filled bladder, and a method of using. The device promotes the assimilation and mixing of the bladder fluid with another fluid, such as during aeration of wine. The device preferably includes a central bore and at least one induction passage which is arranged for either radial or tangential fluid connection from the periphery of the device to the central bore. The induction passage is preferably positioned at an angle greater than zero from the plane perpendicular to the direction of flow.

It is an objective of the invention to provide a venturi which is adapted for use in providing an aerated fluid as it is dispensed from a container, obviating the need for an independent, secondary aeration device.

It is another objective of the invention to provide a venturi which is adapted for use in combination with a valve to thereby provide an aerated fluid as it dispensed from a valved container.

It is a further objetive of the invention to provide a method of fluid aeration, at low fluid flows and low head pressure, during fluid dispensing from a bladder type container.

It is yet another objective of the present invention to combine a valve with an attachable or integrally molded venturi, to provide an aerated fluid as dispensed from a bladder type container.

Another objective of the invention is to provide a dispensing valve having an integrally formed venturi device that is easily produced at low cost using common molding technology.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures.

Figure 1:
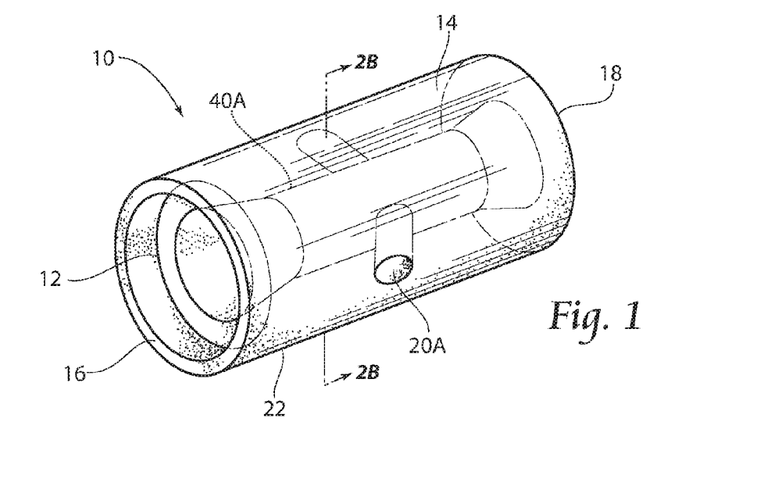
FIG. 1 is a perspective view of an embodiment of a venturi device according to the present invention.

Referring to the drawings, wherein like numerals represent like parts throughout the views, FIG. 1 depicts an embodiment of a venturi device 10 according to the present invention having a body 14, the body including a first end 16, a second end 18, an outer periphery 22, a central bore 40A, and at least one induction passage 20A. The first end 16 further includes a mating interface portion 12. As further illustrated in FIG. 1, the body 14 is preferably cylindrical, however, it should be noted that the body 14 may be fabricated in any number of shapes and designs without affecting the aerating performance of the device 10 or departing from the spirit of the invention.

Figure 2A:
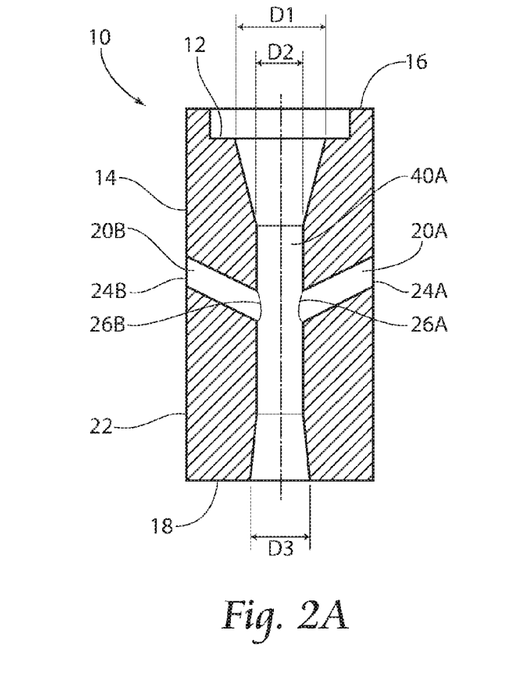
FIG. 2A is a cross-sectional view of the device illustrated in FIG. 1 and taken along lines 2A-2A of FIG. 2B.
Figure 2B:
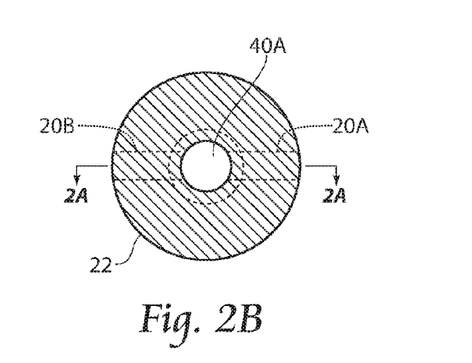
FIG. 2B is a cross-sectional view of the device illustrated in FIG. 1 and taken along line 2B-2B thereof and showing an arrangement of induction passages.
Figure 2C:
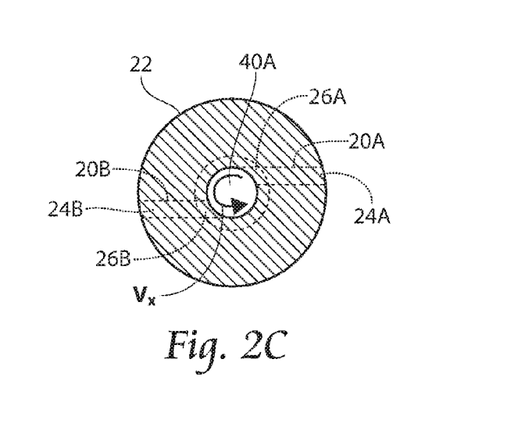
FIG. 2C is a cross-sectional view of an embodiment of the device, similar to that of FIG. 2B, but showing an alternative, tangential arrangement of induction passages.

With reference now to FIG. 2A, a cross-sectional view of the venturi device 10 shown in FIG. 1 may be seen. As viewed, the central bore 40A preferably includes a first diameter D1, a second diameter D2, and a third diameter D3. As may be further seen in FIG. 2A, the third diameter D3 is preferably larger than the second diameter D2 and the first diameter D1 is preferably larger than the third diameter D3. As further illustrated, a first induction passage 20A and a second induction passage 20B each having an entrance 24A, 24B and an exit 26A, 26B, respectively, provide pathways from the outer periphery 22 of the body 14 to the central bore 40A. As shown, the induction passages 20A, 20B are preferably angled such that their respective entrances 24A, 24B are closer than the exits 26A, 26B to the first end 16 of the body 14 with the passages 20A, 20B being positioned at an angle greater than zero from the plane perpendicular to axis of the central bore 40A. It may be further noted, and as seen in FIGS. 2B and 2C, that the induction passages 20A, 20B may extend radially outward or alternatively, tangentially from the central bore 40A to the outer periphery 22.

Figure 3:
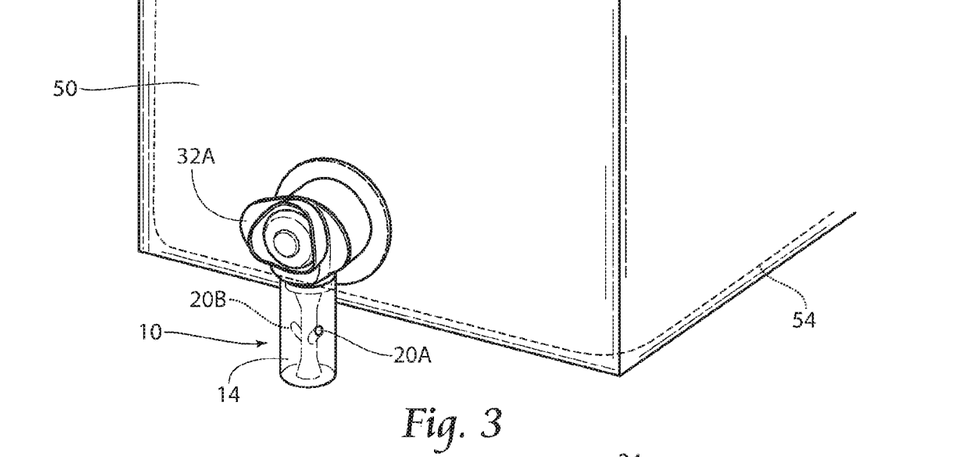
FIG. 3 is a perspective view of the device shown in FIG. 1 in combination with a dispensing valve.
Figures 4A, 4B:
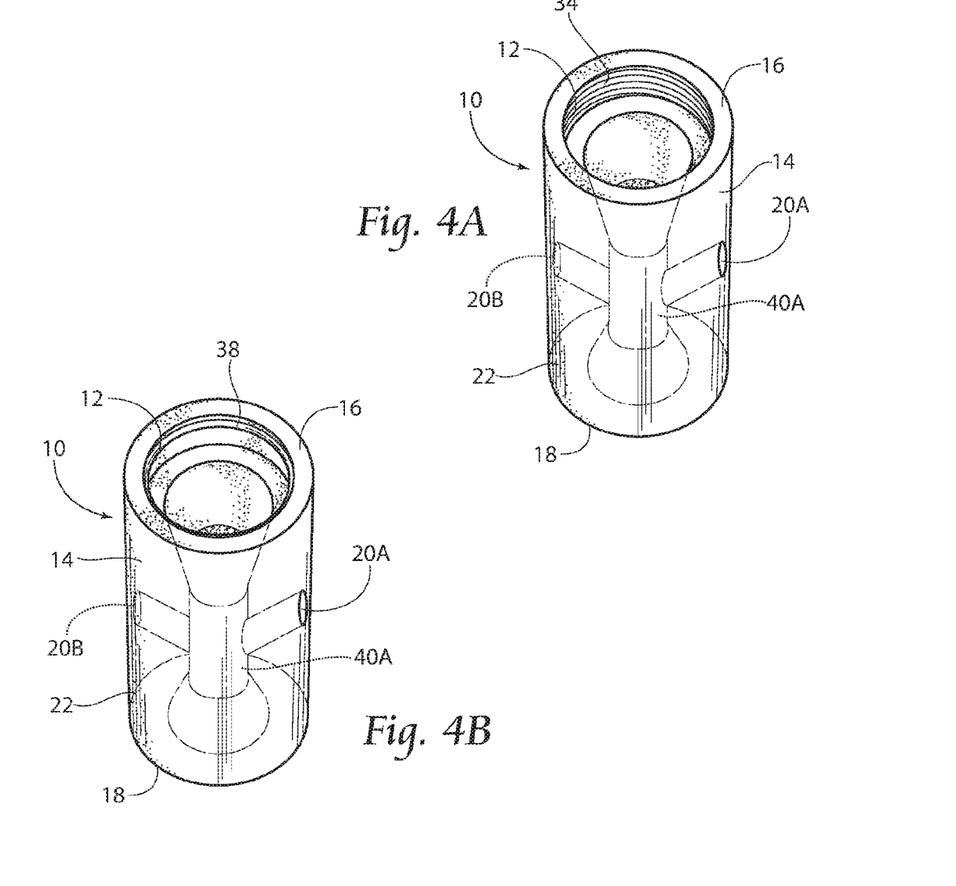
FIG. 4A is a perspective view of an embodiment of the venturi device shown in FIG. 1 showing an attachment means.
FIG. 4B is a perspective view of an embodiment of the venturi device, similar to that of FIG. 4A, but showing an alternative attachment means.

With particular attention to FIG. 3, the device 10 seen FIG. 1 is shown attached to a dispensing valve 32A on a box container 50 such as that used to dispense box wine. Such a container 50 typically houses a fluid retaining bladder 54 and includes known valves 32A, such as those disclosed in U.S. Pat. No. 6,296,157 and manufactured by Scholle Corporation, or those offered by Rapak, for example. The venturi device 10 may be attached to the output portion 13 (see FIG. 6) of dispensing valve 32A in several acceptable manners. For example, and as seen in FIG. 4A, the mating interface 12 of device 10 may be provided with a threaded portion 34. As shown, the threaded portion 34 may be adapted for mating engagement with a respective threaded portion (not shown) of a mating dispensing valve 32A.

Figure 12:
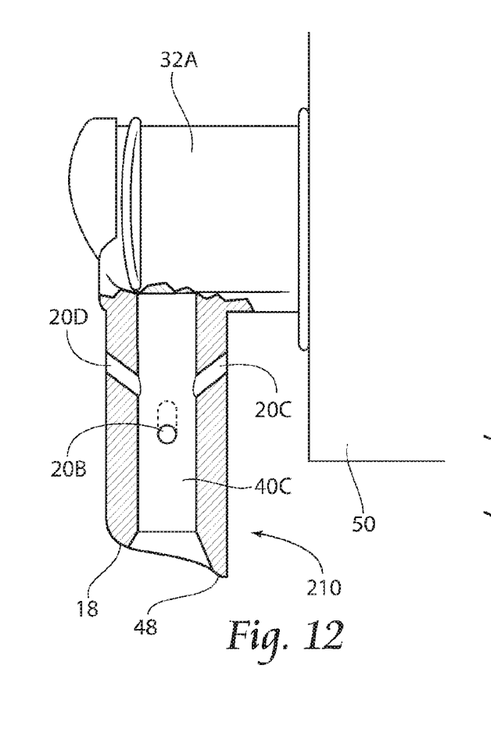
FIG. 12 is a partial section view of the device illustrated in FIG. 9 but showing the device integrally molded with a dispensing valve.

Alternatively, and as seen in FIG. 4B, the device 10 may include a mating interface 12 manufactured of a flexible elastomer and having a rib 38 or a groove (not shown) for mating engagement with a dispensing valve 32A having a corresponding groove (not shown) or a rib (not shown), respectively, via a snap-fit. Other means of attachment include: friction welding, thermal welding, cementing, or press-fitting the mating interface 12 of the venturi device 10 to the dispensing valve 32A, by way of non-limiting examples. Alternatively, and as seen in FIG. 12, the venturi device 10, 210 may be integrally molded with the dispensing valve 32A. Further, and as viewed in FIG. 13, it is within the scope of the invention to attach the device 310 via external means, as when a beverage dispensing nozzle 52 is used.

Figures 5, 6:
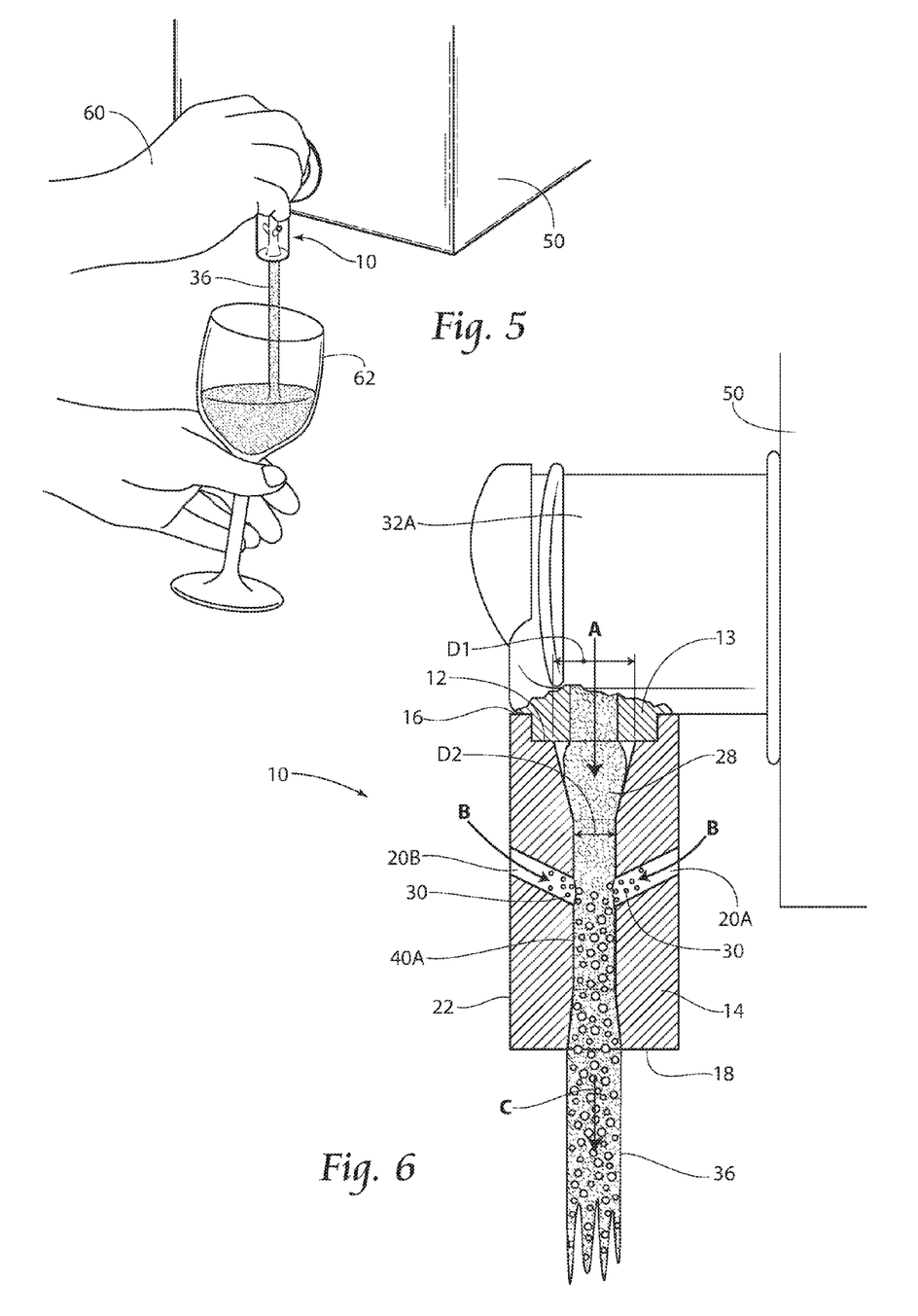
FIG. 5 is a perspective view of the venturi device of FIG. 1 in use.
FIG. 6 is a cross-sectional view of the venturi device illustrated in FIG. 1 in combination with a dispensing valve and illustrating fluid flow and mixing.

Turning now to FIG. 5, a user's hand 60 is shown dispensing a fluid mixture 36, such as aerated wine, from the dispensing valve 32A, through the venturi device 10, and into a glass 62. The method of mixing a first and second fluid for dispensing as the fluid mixture 36 shown, is illustrated in detail in the view of FIG. 6. As shown, a first fluid 28, such as wine, exits the dispensing valve 32A in the direction of arrow A, and into the first end 16 of the venturi device 10. According to the continuity equation, $Q=V_1A_1=V_2A_2$, the larger the first diameter D1 is relative to the second diameter D2, the greater the velocity increase of the first fluid 28 flowing through the central bore 40A in the direction of arrow A. Further, with a greater increase in velocity comes a greater reduction in pressure, thus allowing a greater induction of a second fluid 30, such as ambient air, through the induction passages 20A, 20B in the direction of arrow B to form mixture 36. The mixture 36 of the first fluid 28 and the second fluid 30 then exits through the second end 18 of the venturi device 10 in the direction of arrow C. It is to be understood that the larger the first diameter D1 is relative to the second diameter D2 the larger the increase in velocity of the first fluid 28 as it passes through the central bore 40A, and thus the greater the mixing potential with the second fluid 30. An example of non-limiting approximate relative diameters workable with the device 10 may be D1=0.28", D2=0.17", and D3=0.23". It is to be understood that the listed diameters are meant for illustration only and not to limit the invention. The actual diameters D1, D2, D3 useful with the present invention may be varied depending on factors such as the required interface of the venturi device 10 with various dispensing valves 32A, the desired dispensation flow, or manufacturing and machining considerations.

Now referring back to FIG. 2C, a tangential orientation of the induction passages 20A, 20B may be seen. As viewed, the tangential arrangement with the central bore 40A imparts a rotational effect, or vortex $v_x$, in the first fluid 28 (not shown in this view) as it mixes with the second fluid 30 (see FIG. 6). The vortex $v_x$, if properly utilized, can increase the mixing of the two fluids 28, 30 providing better aeration.

Figure 7:
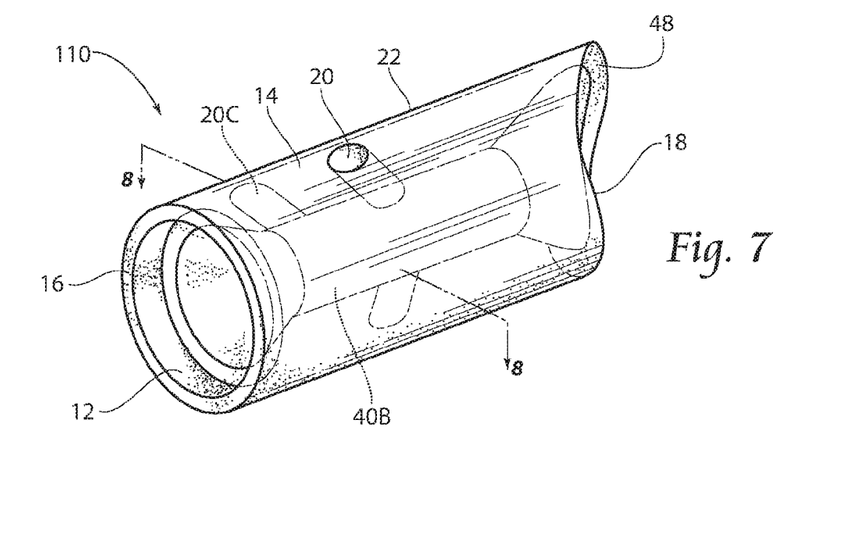
FIG. 7 is a perspective view of an alternative embodiment of the venturi device.
Figure 8:
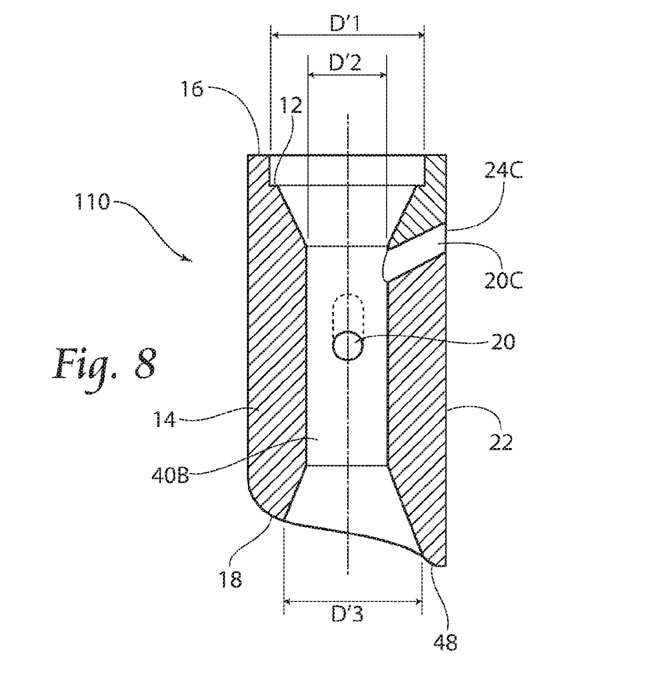
FIG. 8 is a cross-sectional view of the venturi device illustrated in FIG. 7 and taken along line 8-8 thereof.

With reference now to FIGS. 7 and 8, an alternative embodiment 110 may be seen. Similar to the device 10 shown and discussed with reference to FIGS. 1-6, the device 110, shown in FIGS. 7 and 8 includes a body 14 having a first end 16, a second end 18, an outer periphery 22, a mating interface 12, and at least one induction passage 20. However, and as illustrated in FIGS. 7 and 8, the embodiment 110 shown includes a second end 18 having an elongated, tapered portion 48, and a relatively larger central bore 40B as compared to the previous embodiment. As may be further viewed, the device 110 may include at least one induction passage, seen in these views as 20C, which is positioned relatively closer to the first end 16 as compared to passages 20. The location of induction passage 20C promotes additional aeration as the head pressure of the first fluid 28 drops due to the emptying of the box wine container 50 (see FIG. 3) and thereby enables continued function of the device 110 under the low or falling head pressure head pressure associated with bladder type fluid containers 50. It may also be seen that the position of the entrance 24C of induction passage 20C, in addition to its location nearer the first end 16 than passage 20, may be advantageously positioned in the outer periphery 22 in line with the tapered portion 48. Positioning the entrance 24C of passage 20C in line with the tapered portion 48 further facilitates complete dispensation of the fluid mixture 36 after the valve 32A is closed, as will be further discussed.

The embodiment 110 illustrated in FIGS. 7 and 8 provides an alternative device for more easily aerating wine from a wine box 50 or other type of bladder container in conjunction with a dispensing valve 32A. The central bore 40B having relatively larger diameters D'1, D'2, D'3, along with the placement of passage 20C, permits an increased flow rate if so desired. An example of non-limiting approximate relative diameters workable with the device 110 includes D'1=0.48, D'2=0.203, and D'3=0.30, however, it is to be understood that the actual diameters D'1, D'2, D'3 may be varied without departing from the invention. Further, the tapered end portion 48 of the device 110 promotes facile and complete wine dispensation after the dispensing valve 32A (see FIG. 6) is closed. The tapered portion 48 serves to direct residual mixed fluid 36 remaining in the central bore 40B along the third diameter D'3, to thereby collect any residual fluid 36 at the tapered portion 48 and allowing any residual mixed fluid 36 to gain mass and drop. This feature reduces post valve 32A closure dripping of mixed fluid 36 and decreases the likelihood of delayed post dispensing drips and any mess that may follow. Improved efficiency of the tapered portion 48 may be observed when, as mentioned earlier, passage 20C is positioned in line with the tapered portion 48, to thereby promote more thorough collection of residual mixed fluid 36.

Another embodiment of the venturi device 210 is shown in FIGS. 9-11C. Similarly to the devices 10, 110 shown and discussed with reference to FIGS. 1-6 and 7 and 8, the device 210, shown in FIGS. 9 and 10, includes a body 14 having a first end 16, a second end 18, an outer periphery 22, and at least one induction passage 20A. The device 210 further includes a second end 18 having an elongated, tapered end portion 48. However, and as may be seen particularly in FIG. 11A, the device 210 includes a central bore 40C having a first diameter D"1 and a second diameter D"2, wherein the first and second diameters D"1, D"2 are of substantially the same size. As shown, the device 210 may further include induction passages 20C and 20D. As viewed particularly in FIG. 12, the arrangement of alternative embodiment 210 is well suited to be integrally molded with the dispensing valve 32A due to manufacturing and molding considerations. For example, with the first and the second diameters D"1, D"2, respectively, of substantially the same size, the use of a single molding pin (not shown) during manufacturing may be utilized. The molding pin may be extracted from the second end 18 after molding to permit a simpler manufacturing process. The modification of the device 210 as shown and compared to that in FIG. 1, permits a simpler manufacture since the device 10 would likely require two molding pins (not shown), one for each end 16, 18. Further, and as currently envisioned, once molded, the device 10, 110, 210 could be attached to a valve 32A by way of cementitious bonding, snap fit assembly, thermal welding, threading, press-fitting, or other attachment means known to those skilled in the art. Alternatively, it is within the scope of the present invention to mold the valve 32A and the device 10 together as a singular unit.

Figures 9, 10, 11A:
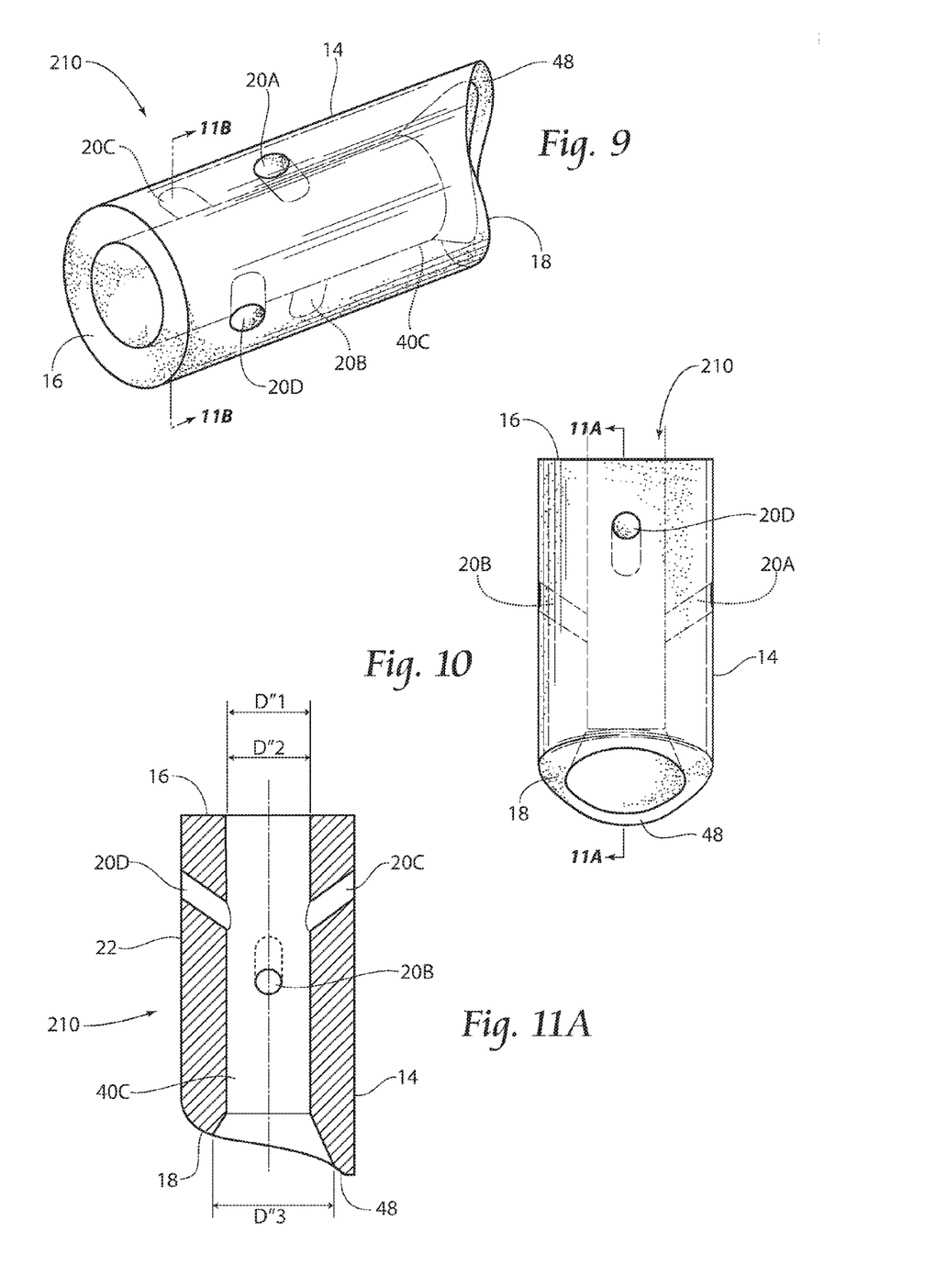
FIG. 9 is a perspective view of an alternative embodiment of the venturi device similar to that of FIG. 7, but showing an arrangement which may be integrally molded with a dispensing valve.
FIG. 10 is a side view of the venturi device of FIG. 9.
FIG. 11A is a cross-sectional view of the venturi device illustrated in FIG. 9 and taken along line 11A-11A of FIG. 10.
Figure 11B:
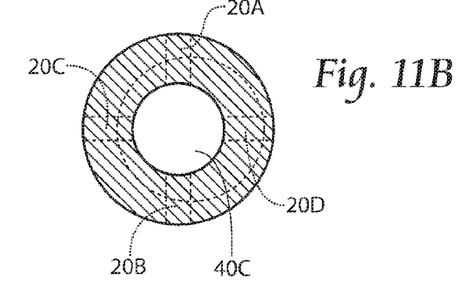
FIG. 11B is a cross-sectional view of the venturi device illustrated in FIG. 9 and taken along line 11B-11B of FIG. 9.
Figure 11C:
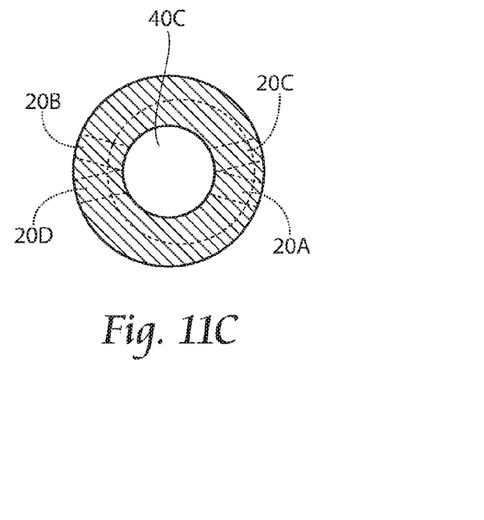
FIG. 11C is a cross-sectional view of an embodiment of the device, similar to that of FIG. 11B, but showing an alternative arrangement of the induction passages.

With further reference to FIG. 11A, the device 210 may be seen to include induction passages 20C and 20D in addition to 20A and 20B. Since the alternative device 210 has a first diameter D"1 of substantially the same dimension as the second diameter D"2, some loss of induction of the second fluid 30 into the first fluid 28 may be observed. As stated earlier, and with reference to FIG. 6, according to the continuity equation, $Q=V_1A_1=V_2A_2$, the larger the first diameter D1 is relative to the second diameter D2, the greater the velocity of the first fluid 28 flowing through the central bore 40 in the direction of arrow A and the higher the level of aeration. Without a significant difference in relative diameters D"1, D"2, some aeration may be lost. However, the alternative embodiment 210 includes induction passages 20C and 20D to thereby ameliorate the velocity loss caused by the lack of a diameter D"1, D"2 differential. The induction passages 20C, 20D cause the rate of induction of the second fluid 30 into the first fluid 28 to increase, and thereby allow the device 210 to provide the required increased aeration. FIGS. 11B and 11C further illustrate alternative relative positions of the induction passages 20C and 20D and the induction passages 20A and 20B to demonstrate that different passage 20A, 20B, 20C, 20D orientations are possible while remaining under the scope of the present invention.

Figure 13:
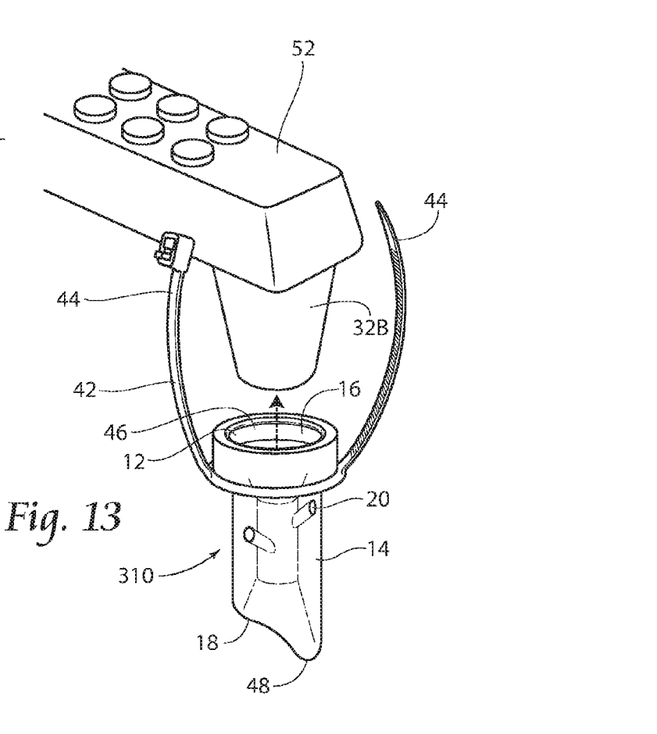
FIG. 13 is a perspective view of another embodiment of the venturi device shown with an alternative attachment means.

Turning now to FIG. 13, another embodiment 310 is shown. As illustrated, the device 310 may be envisioned for use in combination with a beverage dispensing nozzle 52 and for use with an alternative dispenser 32B. When used in the manner shown in FIG. 13, the device 310 preferably includes an external attachment means, such as the securing mechanism 42 shown. Similar to the devices 10, 110, 210 discussed previously, the device 310 shown in FIG. 13 includes a body 14 with a first end 16 and a second end 18, mating interface 12 at the first end 16, and an elongated tapered end portion 48 at the second end 18, and at least one induction passage 20. However, as may be seen in FIG. 13, the embodiment 310 further includes a securing mechanism 42 to attach the device 310 to an alternative dispenser 32B, such as the nozzle 52 shown. As illustrated, the device 310 preferably includes a portion 52 of the first end 16 configured to provide an interface between a portion of the outer periphery 22 and the external securing mechanism 42. Additionally, the external securing mechanism 42 may be equipped with interlocking arms 44 or, in the alternative, a continuous loop configuration (not shown) made from an elastomeric material to provide a secure attachment of the device 310 to the dispensing valve 32B. These two non-limiting examples of the external securing mechanism 42 further allow for attachment and removal of the device 310 from the dispensing valve 32B. Furthermore, a seal may be provided between the device 310 and the dispensing valve 32B by way of conformable elastomerid sealing means such as a gasket or the o-ring 46 shown.

As previously mentioned, the present invention further provides a method of mixing two fluids and dispensing a mixture of the two fluids. A method according to the present invention, seen in particularly in the view of FIG. 6, may include the steps of: providing a first fluid 28, the first fluid 28 being confined within a bladder 54; providing the bladder 54 with a dispensing valve 32, the dispensing valve 34 being operable in open and closed positions and including an output portion 13; providing a venturi device 10, the venturi device 10 including a body 14 having a first end 16, a second end 18, a central bore 40, at least one induction passage 20, and an outer periphery 22; providing the first end 16 of the venturi device 10 with a mating interface 12; providing the at least one induction passage 20 with an entrance 24 and an exit 26, wherein the entrance 24 interfaces with the outer periphery 22 of the device 10 and wherein the exit 26 interfaces with the central bore 40; interfacing the mating interface 12 of the venturi device 10 with the output portion 13 of the dispensing valve 32; opening the dispensing valve 32; moving the first fluid 28 from the bladder 54 through the output 13 of the dispensing valve 32 and into the first end 16 of the venturi device 10; moving the first fluid 28 through the central bore 40 of the venturi device 10; providing a second fluid 30; moving the second fluid 30 through the entrance 24 of the at least one induction passage 20 and toward the central bore 40 of the venturi device 10; mixing the first fluid 28 and the second fluid 30 in the central bore 40 to thereby provide a third, mixed fluid 36; moving the third fluid 36 through the central bore 40 and toward the second end 18; and closing the dispensing valve 32.

As demonstrated, the present invention provides a device 10, 110, 210, 310 and method for mixing a first fluid 28 with a second fluid 30 and to dispense a fluid mixture 36. The design of the device 10, 110, 210, 310 provides an inexpensive, easy to produce and package, easy to handle item, along with a reliable method of dispensing a fluid mixture 36 from a bladder type fluid container 50. The device 10, 110, 210, 310 performs without the need for additional expensive and cumbersome external devices and functions under the low or falling head pressure head pressure associated with bladder type fluid containers 50.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed.

We claim:

1. A mixing device for mixing two fluids comprising:
   a bladder containing a first fluid, said bladder including a dispensing valve, said dispensing valve being operable in open and closed positions, and including an output portion;
   a venturi device, said venturi device comprising a body having a first end, a second end, a central bore, at least one induction passage, and an outer periphery, said first end including a mating interface sized and configured to receive said output portion of said dispensing valve;
   wherein said mating interface, said first end, said second end, and said central bore, are in axial alignment and said output portion is arranged to dispense said first fluid from said bladder and into said first end of said venturi device;
   wherein said at least one induction passage includes an entrance and an exit, said entrance arranged to interface with said outer periphery of said venturi device and to receive a second fluid; and
   wherein said exit interfaces with said central bore.

2. The device of claim 1 wherein said entrance of said at least one induction passage is located closer to said first end than the exit of said induction passage.

3. The device of claim 1, wherein said mating interface is integrally molded to said output portion of said dispensing valve.

4. The device of claim 1 wherein said central bore has a first diameter, a second diameter, and a third diameter.

5. The device of claim 4, wherein said first diameter is larger than said second diameter.

6. The device of claim 4, wherein said third diameter is smaller than said first diameter and larger than said second diameter.

7. The device of claim 1, wherein a portion of said outer periphery at said second end includes an elongated tapered portion.

8. The device of claim 1 wherein said first fluid is wine.

9. The device of claim 1 wherein said second fluid is air.

* * * * *